United States Patent [19]

Anschutz et al.

[11] 3,922,451

[45] Nov. 25, 1975

[54] COATED BEVERAGE CONTAINER AND PROCESS OF COATING

[75] Inventors: James E. Anschutz; Dale S. Gibbs, both of Midland; Harold J. Townsend, Saginaw, all of Mich.

[73] Assignee: The Dow Chemical Company, Midland, Mich.

[22] Filed: Dec. 6, 1973

[21] Appl. No.: 422,375

[52] U.S. Cl. ............ 428/35; 220/64; 260/29.6 TA; 427/230; 427/385; 427/388; 427/409; 428/463; 428/522
[51] Int. Cl.² .................... B32B 27/06; B32B 27/30
[58] Field of Search .. 117/97, 95, 161 UT, 161 UH, 117/161 UC, 132 C, 75, 72, 76 F; 215/1 C; 427/230, 385, 388, 409; 428/35, 463, 522; 260/29.6 TA; 220/64

[56] References Cited

UNITED STATES PATENTS

| | | | |
|---|---|---|---|
| 2,876,818 | 3/1959 | Raff et al. | 117/95 X |
| 3,161,532 | 12/1964 | Sill | 117/76 F X |
| 3,286,904 | 11/1966 | Vieth et al. | 117/132 C X |
| 3,353,992 | 11/1967 | Grenley et al. | 117/132 C X |
| 3,617,368 | 11/1971 | Gibbs et al. | 117/161 UT |
| 3,714,106 | 1/1973 | Smith et al. | 117/132 C X |

OTHER PUBLICATIONS

Maass et al., Linings for Beverage Tin Cans, Metal Finishing, Nov. 1967, pp. 67, 68, 69 & 71.

*Primary Examiner*—Ralph Husack
*Attorney, Agent, or Firm*—Ronald G. Brookens

[57] ABSTRACT

This invention is directed to improved beverage containers having the beverage contacting surfaces thereof coated with a layer of certain vinylidene chloride interpolymers and to a process for providing such layer whereby (1) the beverage contacting surfaces of such containers are substantially uniformly coated with the vinylidene chloride interpolymer in latex form wherein such interpolymer (A) has a clearly distinguishable endotherm between about 100°C and 200°C as measured by differential thermal analysis which endotherm indicates a crystalline melting point, (B) is self-adherent to the surface being coated without imparting significant blush thereto, and (C) is prepared by the substantially continuous addition polymerization of its monomeric ingredients in aqueous dispersion; and (2) wherein the latex coating is subjected to a temperature of at least about 110°C, but below the decomposition temperature of such layer, for a period sufficient to form a substantially continuous, adherent nonporous layer consisting of the dried residues of such latex.

8 Claims, No Drawings

3,922,451

COATED BEVERAGE CONTAINER AND PROCESS OF COATING

BACKGROUND OF THE INVENTION

Substantially rigid containers for beverages, e.g., containers prepared from metals such as aluminum or primed steel or from various plastics, require interior beverage contacting surfaces which are inert to the beverage material and which provide adequate barrier properties for protection from or containment of materials such as carbon dioxide, oxygen and/or water vapor, and to preserve desired taste, odor and appearance of the contents.

In this regard, it is known that coatings prepared from vinylidene chloride polymers and interpolymers, and particularly the normally crystalline polymers and interpolymers of vinylidene chloride, provide excellent resistance to permeability of moisture and gases. Such prior known coatings suffer, however, from several disadvantages when used in the manner prescribed by the present invention. In the first instance, the vinylidene chloride polymer or interpolymer must be highly crystalline to provide adequate barrier properties, i.e., have a clearly distinguishable endotherm between about 100°C and 200°C as measured by differential thermal analysis wherein such endotherm indicates a crystalline melting point. Such high degree of crystallinity, however, renders the coatings generally non-adherent to the surface of the substrate being coated in the absence of chemical treatment such as corona discharge or the use of additional adhesive layers. On the other hand, vinylidene chloride polymers which are amorphous or of relatively low crystallinity exhibit excellent self-adhering properties to a wide range of substrates, but are not sufficiently inert to the action of water, alcohol, sugar and the like which is present in many beverage materials, i.e., such coatings are characterized by undesirable swelling of the coating, known to the art as "blushing."

It is a primary object of the present invention to provide vinylidene chloride polymer or interpolymer coatings for the beverage contacting surfaces of beverage containers which coatings are substantially blush-free as well as self-adherent to the substrate to which applied.

It is also known that vinylidene chloride polymers and interpolymers can be effectively applied as coatings in the form of a latex, i.e., a suspension of the polymeric material in water commonly referred to as a colloidal dispersion. Many of the prior known vinylidene chloride polymer latexes require the presence of a wetting agent or surfactant to maintain the polymeric material in suspension or colloidal dispersion. The presence of such wetting agent or surfactant tends to increase the water sensitivity of coatings prepared from the dried residues of such latexes, with accompanying loss in self-adhesion and barrier properties. It has unexpectedly been discovered, which discovery represents a part of the present invention, that a prescribed group of vinylidene chloride interpolymers can be employed for the purposes of the present invention, wherein the presence or absence of conventionally used wetting agents or surfactants, inclusive of comonomeric surfactants, has no observable effect on the effectiveness of the applied protective coatings.

SUMMARY OF THE INVENTION

The above and related objects and advantages are obtained by application of a protective coating of a vinylidene chloride interpolymer in latex form to the beverage contacting surfaces of a beverage container wherein such interpolymer (A) has a clearly distinguishable endotherm between about 100°C and 200°C as measured by differential thermal analysis, such endotherm indicating a crystalline melting point, (B) is self-adherent to the substrate without imparting significant blush thereto, and (C) is prepared by the substantially continuous addition polymerization of its monomeric components in aqueous dispersion; then subjecting such coating to a temperature of at least about 110°C, but less than the decomposition temperature of the coating, for a period sufficient to form a substantially continuous and non-porous layer composed of the dried residues of such polymeric latex.

It is to be understood that such interpolymer may contain several comonomeric components, in interpolymized form. Examples of such comonomers are acrylonitrile and methacrylonitrile, vinyl chloride, vinyl acetate, vinyl propionate, vinyl hexoate and the alkyl acrylates and methacrylates having from 1 to about 8 carbon atoms, as well as comonomeric emulsifiers such as disclosed in U.S. Pat. No. 3,617,368.

Adhesion promoting comonomers which may be used are those selected from the group consisting of vinyl carboxylic acids, vinyl carboxylic acid amides and hydroxy containing vinyl monomers.

The latexes containing the interpolymers prescribed herein may also contain additives commonly employed in the latex art including conventional amounts of thickeners and anionic, cationic and/or nonionic wetting agents and surfactants.

DESCRIPTION OF THE PREFERRED EMBODIMENTS

As described supra, the vinylidene chloride interpolymers used must be of relatively high crystallinity, i.e., having a clearly distinguishable endotherm between about 100°C and 200°C as measured by differential thermal analysis, which endotherm indicates a crystalline melting point. Preferably, the interpolymers contain from between about 85 and 93 parts by weight of vinylidene chloride, depending on the comonomer used, to assure high crystallinity.

Suitable adhesion-promoting comonomer constituents may be any hydrophilic copolymerizable monomer selected from the group consisting of vinyl carboxylic acids including acrylic acid and methacrylic acid; vinyl carboxylic acid amides, including acrylamide, methacrylamide, N-methylol acrylamide, n-methylol methacrylamide, diacetone acrylamide and hydroxymethyldiacetone acrylamide; and hydroxy containing vinyl monomers such as hydroxyethylacrylate and hydroxypropylacrylate. Preferred such monomers are acrylamide, acrylic acid, hydroxyethylacrylate and hydroxypropylacrylate. It has been found that such comonomers are preferably used in interpolymerized form in an amount of at least about 3 parts by weight to provide optimum adhesion properties in the interpolymer coating, and in concentrations less than 15 parts by weight to preclude undesirable "blushing" of such coatings.

Other comonomers which may be present in the vinylidene chloride interpolymers prescribed for use hereon include acrylonitrile and methacrylonitrile and the alkyl acrylates and alkacrylates having alkyl groups containing from 1 to about 8 carbon atoms, inclusive of methyl acrylate, ethyl acrylate, propyl and isopropyl acrylate, butyl and isobutyl acrylate, hexyl acrylate and 2-ethylhexyl acrylate and the corresponding methacrylate derivatives, in amounts generally up to about 10 parts by weight. Particularly preferred among these materials are acrylonitrile, butyl acrylate and methyl acrylate wherein such materials are present in amounts of from about 7 and 10 parts by weight of the vinylidene chloride interpolymer.

Vinyl monomers may also be used, such as vinyl chloride, vinyl acetate, vinyl propionate and vinyl hexoate, in amounts up to about 15 parts by weight.

Other copolymerizable materials which may be present in the vinylidene chloride interpolymers include the copolymerizable ionic materials set-forth in U.S. Pat. No. 3,617,368 as being selected from the group of sulfonic acids and their salts having the formula $$R\text{-}Z\text{-}Q\text{-}SO_3^-{}_M{}^+$$

wherein the radical R is selected from the group consisting of vinyl and alpha substituted vinyl; the symbol Z represents a difunctional linking group which will activate the double bond in the vinyl group; -Q- is a divalent hydrocarbon having its valence bonds on different carbon atoms; and the symbol $M^+$ represents a cation. These materials are generally present in amount up to about 1.5 parts by weight of the vinylidene chloride interpolymer and function to enhance colloidal stability of latexes prepared from such interpolymers. Exemplary of particularly preferred such materials are: sodium sulfoethyl methacrylate, 2-acrylamido-2-methylpropane sulfonic acid, sodium 2-hydroxy-3-sulfopropyl methacrylate and sodium 2-sulfatoethyl methacrylate and the acrylate derivates of the materials set-forth above. Other useful comonomers include sodium 4-hydroxybutyl methacrylate and aminoethylmethacrylate hydrochloride, and the dimethyl and trimethyl derivatives thereof. As indicated previously, the use of such comonomer is optional for the purposes of the present invention.

Further, as previously referred to, the vinylidene chloride interpolymers of the present invention must be prepared by the substantially continuous addition polymerization of its monomeric components in aqueous dispersion, e.g., as described in U.S. Pat. Nos. 3,297,613 and 3,617,368, to provide protective coatings having the required properties of being blush-free and self-adherent when used in the manner as prescribed by the present invention.

It has further been discovered that such interpolymers may be formed using any conventional initiator system whether such system is classified as an electrolyte or a nonelectrolyte. The examples which follow illustrate the use of typical initiator systems.

The interpolymer latexes used to coat the beverage contacting surfaces may also contain conventionally employed additives in usual concentrations, e.g., thickeners as well as anionic, cationic and nonionic wetting agents or surfactants in amounts up to about 10 parts of wetting agent or surfactant per 100 parts of vinylidene chloride interpolymer solids. That such latexes would provide substantially blush-free, self-adherent coatings, when used in the manner called for by the present invention, is unexpected as the presence of such wetting agents or surfactants, in substantial amount, is known to seriously affect the water sensitivity of conventional vinylidene chloride interpolymer coatings, with accompanying formation of blushing and reduced adhesion and barrier properties. The prescribed interpolymeric latexes have further been found to be substantially insensitive to pH over a range of values of from about 0.5 1 to about 12. Generally, however, the pH of the latex system is maintained within a range of from about 1 to about 8.

The vinylidene chloride interpolymer latexes may be applied in any convenient manner to a wide range of substantially water-insoluble substrates forming the interior surfaces of a beverage container. Thus, such latexes may be effectively used to coat metal surfaces such as aluminum or steel or steel primed with conventional materials such as polybutadiene resin. The latex may also be effectively applied to substantially rigid plastic surfaces such as polyvinyl chloride, the polyolefins, Mylar, epoxy, urethane and many others.

Following application of such interpolymeric latex, it has been found to be critical for obtaining the benefits of the present invention that such coated substrate be subjected to temperatures of at least about 110°C and preferably at least about 130°C, where significant amounts of conventional surfactants or wetting agents are present, but less than the decomposition temperature of the interpolymeric coating, for a period sufficient to form a substantially continuous, nonporous coating composed of the dried residues of the interpolymeric latex. Generally, periods of about 3 to 5 minutes are sufficient at temperatures in the range of about 130°C to 160°C, with shorter periods being employed as the temperatures used approach the decomposition temperature of the interpolymer.

The following examples illustrate the present invention but are not to be construed as limiting its scope. In the examples, parts and percentages are by weight unless otherwise indicated.

EXAMPLE

A -- Preparation of a Typical Vinylidene Chloride Interpolymer

Into a polymerization vessel, immersed in a controlled temperature bath operating at 30°C, was added a mixture of 1050 grams of deionized water (adjusted to pH value of about 3.5 with glacial acetic acid), 2.5 grams Siponate DS-10 emulsifier and 0.06 ppm ferric ion based on initial water charge. The vessel was then purged with nitrogen for 20 minutes and the nitrogen flow thereafter regulated to maintain the reaction under a nitrogen blanket. To this aqueous mixture was subsequently added an initial monomer charge comprising 45 grams of vinylidene chloride and 5 grams of butyl acrylate and 0.2 gram of t-butyl hydroperoxide followed by the addition of a stream comprising 5.38 grams of sodium formaldehyde sulfoxylate in 500 grams of water, at a rate of 7.67 grams of such solution per hour. The initial reaction was completed in two hours. Thereafter, a mixed monomer stream composed of 1800 grams vinylidene chloride, 200 grams butyl acrylate and 5.0 grams of t-butyl hydroperoxide was introduced into the reactor at a rate of 55 grams per hour, along with a separate aqueous monomer stream composed of 69 grams of 16.7 percent aqueous solution of sodium sulfoethyl methacrylate and 230 grams of a 50.4 percent aqueous solution of acrylamide, at a feed rate of 15 grams per hour. At the end of 20 hours of monomer feeding the monomer streams were shut off, 0.5 gm of t-butyl hydroperoxide was added and the aqueous solution of sodium formaldehyde sulfoxylate was continued for an additional 2 hours to complete the reaction. The resulting interpolymer in latex form, contained about 90 parts by weight vinylidene chloride, 10 parts by weight butyl acrylate, 5 parts by weight acrylamide and 0.5 part by weight of sodium sulfoethylmethacrylate (Sample No. 15 of Table 4, infra).

In each of a series of experiments the above procedure was essentially repeated using varying amounts and types of monomeric materials. The following Tables 1 through 5 set forth the composition of the interpolymeric latexes prepared and their effectiveness as protective coatings for polybutadiene primed steel beverage containers. In conducting such experiments the individual latexes were applied to the substrate as 0.25 mil coatings, then subjected to air drying at temperatures of 160°C for a period of 5 minutes. Wet adhesion of the resulting coating of dried residues of the latex to the substrate was determined as the percent of coating removed by application of No. 610 Scotch tape following soaking in water maintained at a temperature of 70°C for a period of about 2 hours. The coated samples were also visually observed and rated for evidence of swelling and haziness. The rating used utilized a numerical value of from 0 to 10 with the higher values indicating increasing swelling or "blushing." All interpolymeric latexes used contained from about 40 to 50 percent by weight of interpolymer solids. In Tables 1 through 5 the following abbreviations have the indicated meanings:

VeCl₂ - vinylidene chloride
BA - butyl acrylate
MA - methyl acrylate
VCN - acrylonitrile
SEM - sodiumsulfoethyl methacrylate
AAM - acrylamide
AEM.HCl - aminoethyl methacrylate, hydrochloride
AA - acrylic acid
HEA - hydroxyethyl acrylate
HPA - hydroxypropyl acrylate

TABLE 1

Low Crystallinity Vinylidene Chloride Interpolymer Latex Coatings Without Copolymeric Adhesion Promoter

| Sample No. | Endotherm at 100–200°C | VeCl₂ | BA | MA | SEM | Wet Adhesion (% removed) | Blush |
|---|---|---|---|---|---|---|---|
| 1 | No | 80 | 20 | — | 1 | 0 | 8 |
| 2 | No | 84 | — | 16 | 1 | 0 | 8 |

The above data illustrate that low crystallinity vinylidene chloride interpolymer latexes adhere well but exhibit excessive blush.

TABLE 2

High Crystallinity Vinylidene Chloride Interpolymer Latex Coatings without Copolymeric Adhesion Promoter

| Sample No. | Endotherm at 100–200°C | VeCl₂ | BA | MA | VCN | SEM | Wet Adhesion (% removed) | Blush |
|---|---|---|---|---|---|---|---|---|
| 3 | Yes | 93 | — | — | 7 | 1 | 100 | 0 |
| 4 | " | 90 | 10 | — | — | 1 | 100 | 0 |
| 5 | " | 92 | — | 8 | — | 1 | 100 | 0 |
| 5 | " | 92 | — | 8 | — | 1 | 100 | 0 |
| 6 | " | 90 | 10 | — | — | 1.5 | 100 | 0 |
| 7 | " | 90 | 5 | — | 5 | — | 100 | 2 |

The above data illustrate that highly crystalline vinylidene chloride interpolymer latexes of the type required by the present invention, but without a copolymeric adhesion promoter, are substantially blush-free but have inadequate adhesion properties.

TABLE 3

Highly Crystalline Vinylidene Chloride Interpolymer Latex Coatings with Varying Amounts of Copolymeric Adhesion Promoter

| Sample No. | Endotherm at 100–200°C | VeCl₂ | BA | SEM | AAM | AA | HEA | HPA | Wet Adhesion (% removed) | Blush |
|---|---|---|---|---|---|---|---|---|---|---|
| 8 | Yes | 90 | 10 | 0.5 | 1 | — | — | — | 100 | 0 |
| 9 | " | 90 | 10 | 0.5 | 3 | — | — | — | 90 | 0 |
| 10 | " | 90 | 10 | 0.5 | 15 | — | — | — | 0 | 10 |
| 11 | " | 90 | 10 | 0.5 | — | 2 | — | — | 100 | 0 |
| 12 | " | 90 | 10 | 0.5 | — | — | 2 | — | 100 | 0 |
| 13 | " | 90 | 10 | 0.5 | — | — | — | 2 | 100 | 0 |

The above data illustrate that highly crystalline vinylidene chloride interpolymer latexes of the type prescribed herein but containing a comonomeric adhesion promoter in amount of 3 parts by weight or less (Sample Nos. 8, 9, 11, 12 and 13) are substantially blush-free but have poor adhesion properties. The data further shows that the prescribed latexes containing 15 parts by weight of copolymeric adhesion promoter (Sample No. 10) has excellent adhesion but exhibits excessive blush.

TABLE 4

Highly Crystalline Vinylidene Chloride Interpolymer Latexes as Prescribed by the Present Invention

| Sample No. | Endotherm at 100–200°C | VeCl$_2$ | BA | MA | VCN | SEM | AAM | HCl | AA | HEA | HPA | Wet Adhesion (% removed) | Blush |
|---|---|---|---|---|---|---|---|---|---|---|---|---|---|
| Series I—Sodium Formaldehyde Sulfoxylate Initiator ||||||||||||||
| 14 | Yes | 90 | 10 | — | — | 1.5 | 5 | — | — | — | — | 0 | 0 |
| 15 | " | 90 | 10 | — | — | 0.5 | 5 | — | — | — | — | 0 | 0 |
| 16 | " | 90 | 10 | — | — | — | 5 | — | — | — | — | 0 | 0 |
| 17 | " | 90 | 10 | — | — | — | 5 | 0.5 | — | — | — | 0 | 0 |
| 18 | " | 93 | — | 7 | — | 0.5 | 5 | — | — | — | — | 0 | 0 |
| 19 | " | 93 | — | 7 | — | 0.5 | 3 | — | — | — | — | 0 | 0 |
| 20 | " | 92 | 8 | — | — | 1.5 | 5 | — | — | — | — | 0 | 0 |
| 21 | " | 90 | 10 | — | — | 0.5 | — | — | 5 | — | — | 0 | 2 |
| 22 | " | 90 | 10 | — | — | 0.5 | — | — | — | 5 | — | 0 | 0 |
| 23 | " | 90 | 10 | — | — | 0.5 | — | — | — | — | 5 | 0 | 1 |
| 24 | " | 90 | 10 | — | — | 0.5 | 6 | — | — | — | — | 0 | 0 |
| 25 | " | 90 | 10 | — | — | 0.5 | 7 | — | — | — | — | 0 | 0 |
| 26 | " | 93 | — | — | 7 | 0.5 | 5 | — | — | — | — | 0 | 0 |
| 27 | " | 90 | 10 | — | — | 0.5 | 10 | — | — | — | — | 0 | 2 |
| Series II—Na$_2$S$_2$O$_8$(0.5 pt by wt.)/Na$_2$S$_2$O$_5$(0.3 pt by wt.) Initiator ||||||||||||||
| 28 | Yes | 90 | 10 | — | — | 0.5 | 10 | — | — | — | — | 0 | 0 |
| 29 | " | 90 | 10 | — | — | — | 5 | — | — | — | — | 0 | 0 |

The above data illustrate various highly crystalline vinylidene chloride interpolymer latexes as prescribed for use by the present invention. A comparison of the Samples set forth under Series I and Series II indicates that advantageous results are obtained using either conventional electrolyte or nonelectrolyte initiator systems during the interpolymer preparation.

TABLE 5

Drying Temperature vs Adhesion and Blush

| Sample No. | Latex Used | Drying Temp °C | Drying Time (min.) | Wet Adhesion (% removed) | Blush |
|---|---|---|---|---|---|
| 30 | Sample 15 (Table 4) | 130 | 5 | 0 | 0 |
| 31 | " | 25 | 24 hr | 100 | 0 |
| 32 | Sample 18 (Table 4) | 160 | 5 | 0 | 0 |
| 33 | " | 25 | 24 hr | 100 | 0 |
| 34 | Sample 22 (Table 4) | 160 | 5 | 0 | 0 |
| 35 | " | 25 | 24 hr | 100 | 10 |

The above data illustrate the necessity of drying the interpolymeric latex coatings at the prescribed temperatures.

In yet another experiment, conducted essentially as described above, a dried protective coating on a polybutadiene primed steel beverage container was formed by application of a first coat of a low crystallinity vinylidene chloride latex without hydrophilic adhesion-promoter (Sample No. 1 of Table 1); followed by a second coat of a highly crystalline vinylidene chloride interpolymer without hydrophilic comonomeric adhesion promoter (Sample No. 4 of Table 2). The wet adhesion value of this material was 0 and the blush rating was 2. This experiment indicates that excellent adhesion and adequate blush resistance is obtained by use of multiple coats of interpolymeric latexes in the absence of a copolymeric adhesion promoter but that higher total coating weight is required.

In two additional experiments, dried protective coatings were formed on individual polybutadiene primed steel beverage containers from a highly crystalline vinylidene chloride interpolymer latex composed of about 93 parts by weight vinylidene chloride, about 7 parts by weight methyl acrylate, about 0.5 part by weight sodium sulfoethylmethacrylate and from about 1 to 3 parts by weight acrylamide. These coatings were each characterized by a wet adhesive value of 0 and a blush value of 0. These particular interpolymers are unique in that the comonomeric adhesion promoter acrylamide may be used in concentrations as low as 1 part by weight to obtain the beneficial results of the present invention.

What is claimed is:

1. A process for applying a substantially blush-free, self-adherent protective coating on the beverage contacting surfaces of a substantially rigid beverage container, said process comprising
    1. coating said surfaces with a continuous coating of a vinylidene chloride interpolymer in latex form wherein said interpolymer when in the form of a dried coating has a clearly distinguishable endotherm between about 100°C. and 200°C. as measured by differential thermal analysis, said endotherm indicating a crystalline melting point, said interpolymer consisting essentially of (a) from about 85 and 93 parts by weight of vinylidene chloride, (b) up to about 10 parts by weight of a comonomer selected from the group consisting of acrylonitrile, methacrylonitrile, methyl acrylate, ethyl acrylate, propyl and isopropyl acrylate, butyl and isobutyl acrylate, hexyl acrylate and 2-ethylhexyl acrylate and the corresponding methacrylate derivatives, (c) at least 3 but less than 15 parts by weight of a hydrophilic adhesion promoting comonomer selected from the group consisting of acrylic acid, methacrylic acid, acrylamide, methacrylamide, N-methylol acrylamide, N-methylol methacrylamide, diacetone acrylamide, hydroxymethyldiacetone acrylamide, hydroxyethylacrylate and hydroxypropylacrylate, and (d) up to about 1.5 parts by weight of a copolymerizable emulsifier selected from the group of sulfonic acids and their salts having the formula

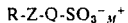

wherein the radical R is selected from the group consisting of vinyl and alpha substituted vinyl; the symbol Z represents a difunctional linking group which will activate the double bond in the vinyl group; -Q- is a divalent hydrocarbon having its valence bonds of different carbon atoms; and the symbol M+ represents a cation, said interpolymers being prepared by the substantially continuous addition polymerization of its monomeric components in aqueous dispersion, then 2. subjecting said coating to a temperature of at least about 110°C. but below the decomposition temperature of said coating for a period sufficient to form a substantially continuous, adherent, nonporous, nonblushing layer composed of the dried residues of said latex.

2. The process of claim 1 wherein (b) is from about 7 to 10 parts by weight of a comonomer selected from the group consisting of acrylonitrile, butyl acrylate and methyl acrylate.

3. The process of claim 1 wherein said vinylidene chloride interpolymer is prepared by the polymerization of (a) about 90 parts by weight of vinylidene chloride, (b) about 10 parts by weight of butyl acrylate, (c) about 5 parts by weight of acrylamide, and (d) up to about 1.5 parts by weight of the sodium salt of sulfoethyl methacrylate.

4. The process of claim 1 wherein said vinylidene chloride interpolymer is prepared by the polymerization of (a) about 93 parts by weight of vinylidene chloride, (b) about 7 parts by weight of methyl acrylate, (c) about 0.5 part by weight of sodium sulfoethyl methacrylate, and (d) from 1 to 3 parts by weight of acrylamide.

5. A beverage container having the beverage contacting surfaces thereof coated by the process of claim 1.

6. A beverage container having the beverage contacting surfaces thereof coated by the process of claim 2.

7. A beverage container having the beverage contacting surfaces thereof coated by the process of claim 3.

8. A beverage container having the beverage contacting surfaces thereof coated by the process of claim 4.

* * * * *